US012671629B2

(12) United States Patent
Mitra et al.

(10) Patent No.: US 12,671,629 B2
(45) Date of Patent: Jun. 30, 2026

(54) NETWORK ENERGY SAVINGS USING BANDWIDTH SCALING

(71) Applicant: Dell Products L.P., Round Rock, TX (US)

(72) Inventors: Jeebak Mitra, Ottawa (CA); Gwenael Poitau, Montreal (CA)

(73) Assignee: Dell Products L.P., Round Rock, TX (US)

( * ) Notice: Subject to any disclaimer, the term of this patent is extended or adjusted under 35 U.S.C. 154(b) by 90 days.

(21) Appl. No.: 18/364,442

(22) Filed: Aug. 2, 2023

(65) Prior Publication Data

US 2025/0047562 A1     Feb. 6, 2025

(51) Int. Cl.
*G06F 15/173*        (2006.01)
*H04L 41/0896*      (2022.01)
*H04L 41/14*          (2022.01)

(52) U.S. Cl.
CPC ........ *H04L 41/0896* (2013.01); *H04L 41/145* (2013.01)

(58) Field of Classification Search
CPC ... H04L 5/0098; H04L 5/0042; H04L 5/0064; H04L 47/781; H04L 41/0896; H04L 41/145
See application file for complete search history.

(56) References Cited

U.S. PATENT DOCUMENTS

2019/0199602 A1* 6/2019 Zhang ................. H04L 43/0829
2020/0107266 A1* 4/2020 Liao ...................... H04W 76/28
(Continued)

FOREIGN PATENT DOCUMENTS

| EP | 3 668 264 | 6/2020 |
| WO | 2022/096490 | 5/2022 |
| WO | 2022/255775 | 12/2022 |

OTHER PUBLICATIONS

J. Jeon, "NR Wide Bandwidth Operations," IEEE Communications Magazine on Key Technologies for 5G New Radio, initial submission on Aug. 1, 2017, Revised on Dec. 14, 2017, and accepted on Dec. 18, 2017. 11 pages.

(Continued)

*Primary Examiner* — Suraj M Joshi
*Assistant Examiner* — Hao H Nguyen
(74) *Attorney, Agent, or Firm* — Amin, Turocy & Watson, LLP

(57)        ABSTRACT

A method can comprise allocating, by a system, an adaptive cell-specific bandwidth part for facilitation of cellular network communications, wherein the adaptive cell-specific bandwidth part comprises a group of bandwidth sizes that enable different energy consumption by the cellular network. The method can further comprise transitioning, by the system, from a first bandwidth size to a second bandwidth size, wherein the second bandwidth size is smaller, based on determining that the second bandwidth size is sufficient to serve a predicted amount of network traffic. The method can further comprise, after transitioning to the second bandwidth size, transitioning, by the system, from the second bandwidth size to the first bandwidth size, based on determining that a second criterion has been satisfied. The method can further comprise, after transitioning from the second bandwidth size to the first bandwidth size, facilitating, by the system, cellular network communications with the first bandwidth size.

20 Claims, 11 Drawing Sheets

100

(56) References Cited

U.S. PATENT DOCUMENTS

| | | | | |
|---|---|---|---|---|
| 2021/0051631 A1* | 2/2021 | Deogun | ............... | H04L 5/0098 |
| 2021/0289502 A1* | 9/2021 | Ang | ..................... | H04L 5/0064 |
| 2021/0368509 A1* | 11/2021 | Lin | ....................... | H04W 24/08 |
| 2022/0052821 A1* | 2/2022 | Kim | .................. | H04W 72/0446 |
| 2022/0140985 A1* | 5/2022 | Li | ..................... | H04W 52/0229 |
| | | | | 370/329 |
| 2022/0167267 A1* | 5/2022 | Ma | .................... | H04W 52/0235 |
| 2022/0329371 A1* | 10/2022 | Awoniyi-Oteri | ...... | H04L 5/0032 |
| 2023/0066679 A1* | 3/2023 | Xu | ........................ | H04W 72/23 |
| 2023/0308948 A1* | 9/2023 | Jia | ......................... | H04W 36/06 |
| 2023/0338329 A1* | 10/2023 | Gore | ................... | A61K 9/1075 |
| 2023/0345508 A1* | 10/2023 | Lei | ..................... | H04W 72/0453 |
| 2023/0403604 A1* | 12/2023 | Maleki | ................. | H04W 52/02 |
| 2024/0040504 A1* | 2/2024 | Abotabl | ............ | H04W 52/0235 |
| 2024/0107466 A1* | 3/2024 | Abotabl | ............ | H04W 52/0245 |
| 2024/0129924 A1* | 4/2024 | Zorgui | .................. | H04L 5/0098 |
| 2024/0147469 A1* | 5/2024 | Hande | .................. | H04W 84/00 |
| 2024/0179599 A1* | 5/2024 | Lei | ........................ | H04W 24/10 |

OTHER PUBLICATIONS

V. Ramaswamy, J. T. Correia and D. Swain-Walsh, "Analytical Evaluation of Bandwidth Part Adaptation in 5G New Radio," 2021 IEEE 32nd Annual International Symposium on Personal, Indoor and Mobile Radio Communications (PIMRC), Helsinki, Finland, 2021. 6 pages.

F. Abinader et al., "Impact of Bandwidth Part (BWP) Switching on 5G NR System Performance," 2019 IEEE 2nd 5G World Forum (5GWF), Dresden, Germany, 2019. 6 pages.

"Bandwidth Part Adaptation", MediaTek Whitepaper, [https://d8602zu8ugzlg.cloudfront.net/mediatek-craft/documents/Bandwidth-Part-Adaptation-White-Paper-PDFBPAWPA4.pdf], 2018, 15 pages.

International Search Report and Written Opinion mailed Apr. 24, 2024 for PCT Application No. PCT/US023/036311, 16 pages.

"3rd Generation Partnership Project; Technical Specification Group Radio Access Network; NR; Physical channels and modulation (Release 15)" 3GPP TS 38.300, V15.14.0, Mar. 2023, 101 pages.

"3rd Generation Partnership Project; Technical Specification Group Radio Access Network; NR; Physical channels and modulation (Release 15)" 3GPP TS 38.211, V15.10.0, Dec. 2021, 96 pages.

"3rd Generation Partnership Project; Technical Specification Group Services and System Aspects; Release 15 Description; Summary of Rel-15 Work Items (Release 15)" 3GPP TR 21.915, V15.0.0, Sep. 2019, 118 pages.

Notification Concerning Transmittal of International Preliminary Report on Patentability mailed Feb. 12, 2026 for PCT Application No. PCT/US2023/036311, 11 pages.

European Office Action mailed Mar. 10, 2026 for European Patent Application No. 23817243.1, 3 pages.

* cited by examiner

100
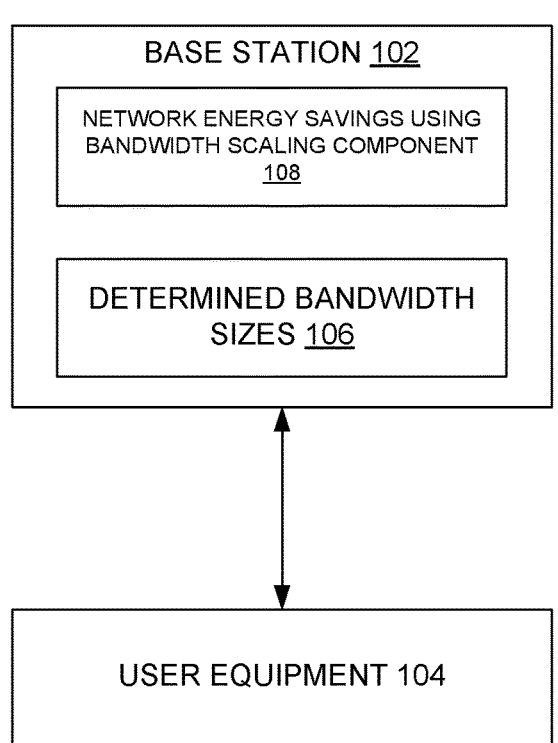
BASE STATION 102
NETWORK ENERGY SAVINGS USING BANDWIDTH SCALING COMPONENT 108
DETERMINED BANDWIDTH SIZES 106
USER EQUIPMENT 104
FIG. 1

200
NETWORK ENERGY SAVINGS USING
BANDWIDTH SCALING COMPONENT
216
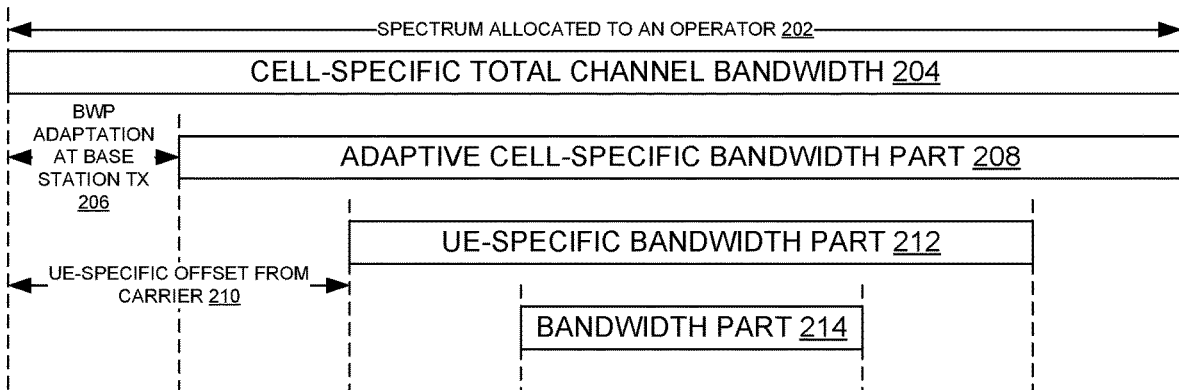
FIG. 2

400
NETWORK ENERGY SAVINGS USING
BANDWIDTH SCALING COMPONENT
412
BANDWIDTH
ADAPTATION
SIZES 402
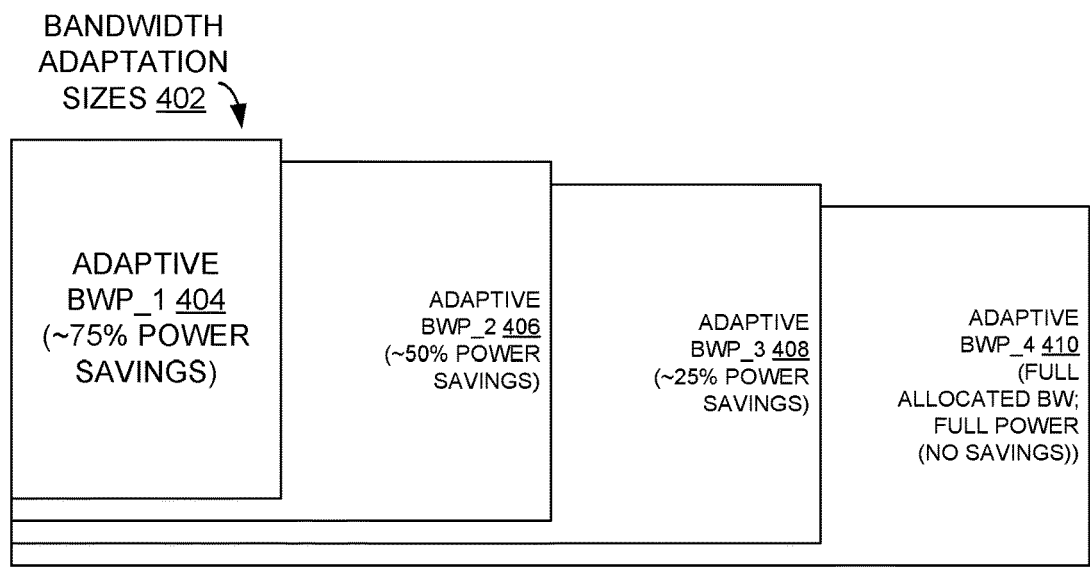
ADAPTIVE
BWP_1 404
(~75% POWER
SAVINGS)
ADAPTIVE
BWP_2 406
(~50% POWER
SAVINGS)
ADAPTIVE
BWP_3 408
(~25% POWER
SAVINGS)
ADAPTIVE
BWP_4 410
(FULL
ALLOCATED BW;
FULL POWER
(NO SAVINGS))
FIG. 4

500
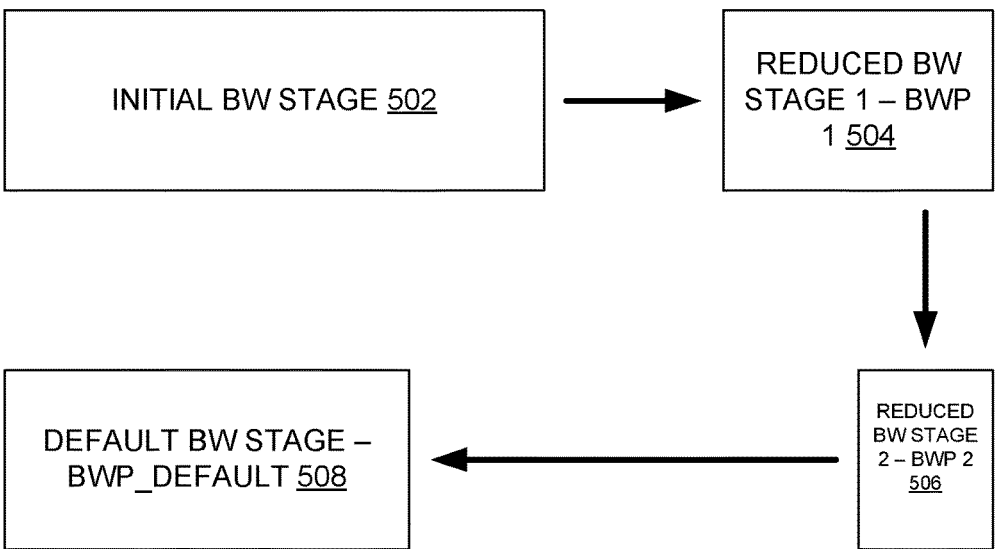
NETWORK ENERGY SAVINGS USING
BANDWIDTH SCALING COMPONENT
510
INITIAL BW STAGE 502 → REDUCED BW STAGE 1 – BWP 1 504
REDUCED BW STAGE 2 – BWP 2 506
DEFAULT BW STAGE – BWP_DEFAULT 508
FIG. 5

600

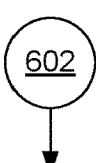

602

ALLOCATING AN ADAPTIVE CELL-SPECIFIC BANDWIDTH PART FOR FACILITATION OF CELLULAR NETWORK COMMUNICATIONS, WHEREIN THE ADAPTIVE CELL-SPECIFIC BANDWIDTH PART COMPRISES A GROUP OF BANDWIDTH SIZES, AND WHEREIN RESPECTIVE SIZES OF THE GROUP OF BANDWIDTH SIZES ARE ASSOCIATED WITH RESPECTIVE FREQUENCY RANGES 604

TRANSITIONING FROM A FIRST BANDWIDTH SIZE OF THE GROUP OF BANDWIDTH SIZES TO A SECOND BANDWIDTH SIZE OF THE GROUP OF BANDWIDTH SIZES, WHEREIN THE SECOND BANDWIDTH SIZE IS SMALLER THAN THE FIRST BANDWIDTH SIZE, BASED ON DETERMINING THAT THE SECOND BANDWIDTH SIZE IS SUFFICIENT, ACCORDING TO A FIRST CRITERION, TO SERVE A PREDICTED AMOUNT OF NETWORK TRAFFIC 606

FACILITATING FIRST CELLULAR NETWORK COMMUNICATIONS ACCORDING TO THE SECOND BANDWIDTH SIZE 608

AFTER TRANSITIONING FROM THE FIRST BANDWIDTH SIZE TO THE SECOND BANDWIDTH SIZE, TRANSITIONING FROM THE SECOND BANDWIDTH SIZE TO THE FIRST BANDWIDTH SIZE, BASED ON DETERMINING THAT A SECOND CRITERION HAS BEEN SATISFIED 610

AFTER TRANSITIONING FROM THE SECOND BANDWIDTH SIZE TO THE FIRST BANDWIDTH SIZE, FACILITATING SECOND CELLULAR NETWORK COMMUNICATIONS ACCORDING TO THE FIRST BANDWIDTH SIZE 612

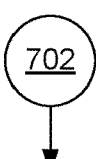

702

MAINTAINING A GROUP OF BANDWIDTH SIZES FOR CELLULAR NETWORK COMMUNICATIONS, WHEREIN RESPECTIVE SIZES OF THE GROUP OF BANDWIDTH SIZES CORRESPOND TO RESPECTIVE FREQUENCY RANGES 704

TRANSITIONING FROM A FIRST BANDWIDTH SIZE OF THE GROUP OF BANDWIDTH SIZES TO A SECOND BANDWIDTH SIZE OF THE GROUP OF BANDWIDTH SIZES, WHEREIN THE SECOND BANDWIDTH SIZE IS SMALLER THAN THE FIRST BANDWIDTH SIZE, BASED ON DETERMINING THAT THE SECOND BANDWIDTH SIZE IS SUFFICIENT, ACCORDING TO A FIRST CRITERION, TO SERVE A PREDICTED AMOUNT OF NETWORK TRAFFIC 706

COMMUNICATING FIRST CELLULAR NETWORK COMMUNICATIONS ACCORDING TO THE SECOND BANDWIDTH SIZE 708

AFTER TRANSITIONING FROM THE FIRST BANDWIDTH SIZE TO THE SECOND BANDWIDTH SIZE, TRANSITIONING FROM THE SECOND BANDWIDTH SIZE TO THE FIRST BANDWIDTH SIZE, BASED ON DETERMINING THAT A SECOND CRITERION HAS BEEN SATISFIED 710

COMMUNICATING SECOND CELLULAR NETWORK COMMUNICATIONS ACCORDING TO THE FIRST BANDWIDTH SIZE 712

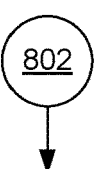

TRANSITIONING FROM A FIRST BANDWIDTH SIZE OF A GROUP OF BANDWIDTH SIZES TO A SECOND BANDWIDTH SIZE OF THE GROUP OF BANDWIDTH SIZES, WHEREIN THE SECOND BANDWIDTH SIZE IS SMALLER THAN THE FIRST BANDWIDTH SIZE, BASED ON DETERMINING THAT THE SECOND BANDWIDTH SIZE IS THRESHOLD CAPABLE TO SERVE A PREDICTED AMOUNT OF CELLULAR NETWORK TRAFFIC 804

FACILITATING FIRST CELLULAR NETWORK COMMUNICATIONS ACCORDING TO THE SECOND BANDWIDTH SIZE 806

AFTER TRANSITIONING FROM THE FIRST BANDWIDTH SIZE TO THE SECOND BANDWIDTH SIZE, TRANSITIONING FROM THE SECOND BANDWIDTH SIZE TO THE FIRST BANDWIDTH SIZE, BASED ON DETERMINING THAT A CRITERION HAS BEEN MET 808

FACILITATING SECOND CELLULAR NETWORK COMMUNICATIONS ACCORDING TO THE FIRST BANDWIDTH SIZE 810

900
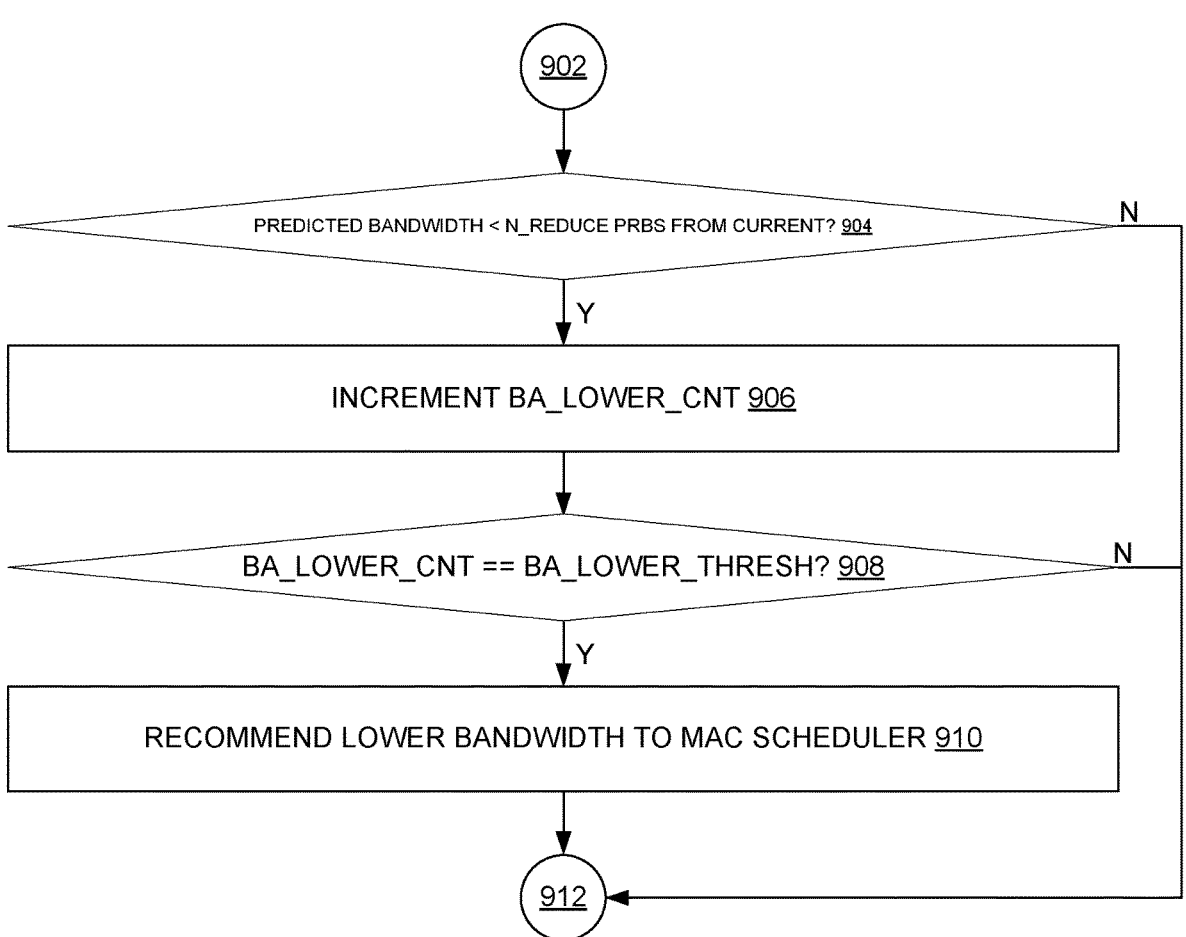
FIG. 9

1000

( 1002 )

< MAX BANDWIDTH USED? 1004 — N

Y

TRAFFIC DEMAND EXCEEDS CURRENT BANDWIDTH? 1006 — N

Y

INCREMENT BA_HIGHER_CNT 1008

BA_HIGHER_CNT == BA_HIGHER_THRESH? 1010 — N

Y

RECOMMEND HIGHER BANDWIDTH TO MAC SCHEDULER 1012

( 1014 )

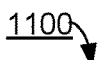
1100
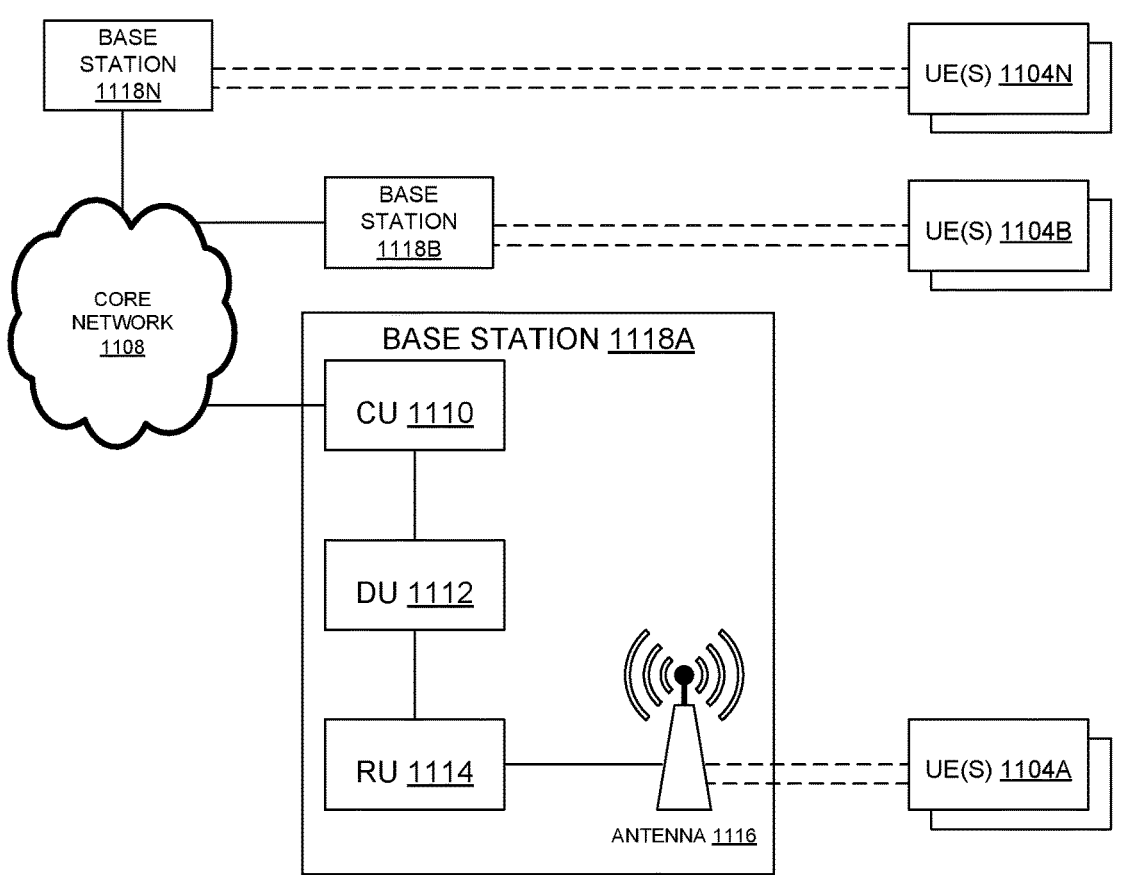
FIG. 11

NETWORK ENERGY SAVINGS USING BANDWIDTH SCALING

BACKGROUND

A base station can communicate with user equipment to facilitate mobile communications, or cellular network communications. In doing so, the base station can consume energy.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example method can comprise allocating, by a system, an adaptive cell-specific bandwidth part for facilitation of cellular network communications, wherein the adaptive cell-specific bandwidth part comprises a group of bandwidth sizes, and wherein respective sizes of the group of bandwidth sizes are associated with respective frequency ranges. The method can further comprise transitioning, by the system, from a first bandwidth size of the group of bandwidth sizes to a second bandwidth size of the group of bandwidth sizes, wherein the second bandwidth size is smaller than the first bandwidth size, based on determining that the second bandwidth size is sufficient, according to a first criterion, to serve a predicted amount of network traffic. The method can further comprise facilitating, by the system, first cellular network communications according to the second bandwidth size. The method can further comprise, after transitioning from the first bandwidth size to the second bandwidth size, transitioning, by the system, from the second bandwidth size to the first bandwidth size, based on determining that a second criterion has been satisfied. The method can further comprise, after transitioning from the second bandwidth size to the first bandwidth size, facilitating, by the system, second cellular network communications according to the first bandwidth size.

An example system can operate as follows. The system can maintain a group of bandwidth sizes for cellular network communications, wherein respective sizes of the group of bandwidth sizes correspond to respective frequency ranges. The system can transition from a first bandwidth size of the group of bandwidth sizes to a second bandwidth size of the group of bandwidth sizes, wherein the second bandwidth size is smaller than the first bandwidth size, based on determining that the second bandwidth size is sufficient, according to a first criterion, to serve a predicted amount of network traffic. The system can communicate first cellular network communications according to the second bandwidth size. The system can, after transitioning from the first bandwidth size to the second bandwidth size, transition from the second bandwidth size to the first bandwidth size, based on determining that a second criterion has been satisfied. The system can communicate second cellular network communications according to the first bandwidth size.

An example non-transitory computer-readable medium can comprise instructions that, in response to execution, cause a system comprising a processor to perform operations. These operations can comprise transitioning from a first bandwidth size of a group of bandwidth sizes to a second bandwidth size of the group of bandwidth sizes, wherein the second bandwidth size is smaller than the first bandwidth size, based on determining that the second bandwidth size is threshold capable to serve a predicted amount of cellular network traffic. These operations can further comprise facilitating first cellular network communications according to the second bandwidth size. These operations can further comprise, after transitioning from the first bandwidth size to the second bandwidth size, transitioning from the second bandwidth size to the first bandwidth size, based on determining that a criterion has been met. These operations can further comprise facilitating second cellular network communications according to the first bandwidth size.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example system architecture that can facilitate network energy savings using bandwidth scaling, in accordance with an embodiment of this disclosure;

FIG. 2 illustrates an example adaptive bandwidth usage for a base station based on operator spectrum allocation in fifth generation new radio (5G NR) communications that can facilitate network energy savings using bandwidth scaling, in accordance with an embodiment of this disclosure;

FIG. 4 illustrates example relative bandwidth parts that can facilitate bandwidth adaptation for downlink communications at a base station that can facilitate network energy savings using bandwidth scaling, in accordance with an embodiment of this disclosure;

FIG. 5 illustrates an example lifecycle management technique for bandwidth adaptation at a base station using a bandwidth part that can facilitate network energy savings using bandwidth scaling, in accordance with an embodiment of this disclosure;

FIG. 6 illustrates an example process flow that can facilitate network energy savings using bandwidth scaling in base stations, in accordance with an embodiment of this disclosure;

FIG. 7 illustrates another example process flow that can facilitate network energy savings using bandwidth scaling in base stations, in accordance with an embodiment of this disclosure;

FIG. 8 illustrates another example process flow that can facilitate network energy savings using bandwidth scaling in base stations, in accordance with an embodiment of this disclosure;

FIG. 9 illustrates an example process flow for decreasing bandwidth that can facilitate network energy savings using bandwidth scaling in base stations, in accordance with an embodiment of this disclosure;

FIG. 11 illustrates an example block diagram of a computer operable to execute an embodiment of this disclosure.

DETAILED DESCRIPTION

Overview

Figure 3:
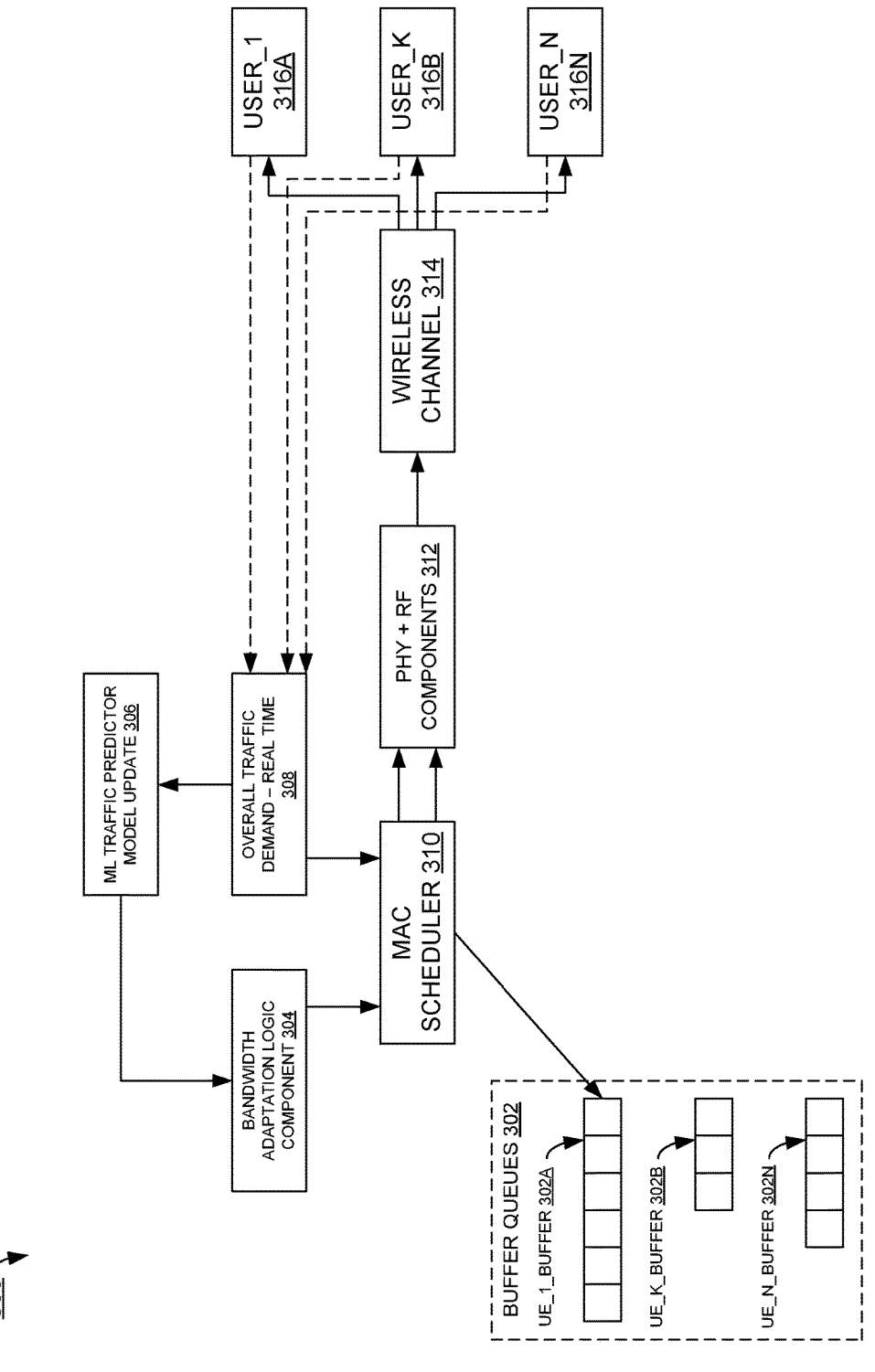
FIG. 3 illustrates an example bandwidth adaptation scheme for scheduling for dynamic bandwidth adaptation that can facilitate network energy savings using bandwidth scaling, in accordance with an embodiment of this disclosure.

Examples described herein can refer to optimizing things, such as base station calibration. It can be appreciated that the present techniques can be applied to improving similar metrics, even though the improvement might not be an optimal outcome. Similarly, where examples describe superlatives, such as maximizing a metric, it can be appreciated that there can be examples where an improvement or increase in that metric occurs.

While the examples herein generally relate to fifth generation (5G) new radio networks, it can be appreciated that the present techniques can be applied to other types of networks.

Efficient spectrum usage and utilization can become increasingly important for future cellular network deployments, in order to cope with increased data rate and capacity demands. An increasing energy consumption of mobile networks can be a critical cost factor in modernization and expansion to 5G networks and beyond. Improving an energy efficiency of the networks can furthermore be centered around reducing power consumption of a radio access network (RAN), as it can account for almost 80% of the total energy expenses. In some examples, one aspect that has contributed to this continued increase in energy expenses is a widening of transmission bandwidth over successive generations of cellular wireless communications. From the introduction of a carrier bandwidths between 5 to 20 megahertz (MHz) for fourth generation (4G) communications, a maximum available bandwidth can be 400 MHz for 5G networks (with carrier aggregation), which is 20 times greater. While this can greatly enhance overall throughputs, and can enable futuristic low latency applications such as augmented reality/virtual reality (AR/VR), it can also create a significant power consumption burden due to wideband power amplifiers (PAs) used at the base stations (BS). The present techniques can be implemented to facilitate reducing such massive power consumption for the base station using adaptive bandwidth scaling for adaptation and translating that adaptive bandwidth scaling into energy efficiency gains.

With a current thrust towards energy savings, there is a search for techniques that are beneficial to a reduction of overall operational power consumption. It can be that up to 80% of energy usage in mobile networks can be attributed to RAN elements, and this problem can be worse with the growing adoption of 5G NR networks despite several measures being adopted within the specifications to reduce transmission overhead where possible. In that context, a use of wider bandwidths in 5G NR can exacerbate problems related to power consumption if proper steps are not taken to optimize energy usage of the RAN.

A 5G NR network can comprise a concept of numerology to accommodate different subcarrier bandwidths that cater to different latency and throughput requirements of targeted use cases. In some examples, a 5G NR network can support wide carrier bandwidths, up to 200 MHz for Frequency Range 1 (FR1, e.g., sub 6 gigahertz (GHz)) and up to 400 MHz for Frequency Range 2 (FR2, e.g., 24-52 GHz). This can cause a severe energy drain on the user equipment (UE) where the UE is required to monitor such a large bandwidth to maintain connectivity and request services. Since, in some examples, most UE downlink (DL) traffic can be serviced through a much narrower bandwidth slice, some amount of flexibility can be required on the bandwidth monitored by the UE so as to reduce the significant demands that can be placed on its battery, as most devices have limited power. To provide a unified solution for numerology and carrier bandwidth (BW) flexibility, the 3rd Generation Partnership Project (3GPP) Release 15 specifications identify a bandwidth part (BWP) for 5G NR. A BWP as specified in the 3GPP standard allows only for receiver-side bandwidth adaptation as specified for a 5G NR access interface, i.e., the use of BWP applied only to the UE. In general, a subset of total cell bandwidth can be referred to as a BWP, and bandwidth adaptation (BA) can be achieved by configuring the UE with BWP(s) with the base station notifying the UE which of the configured BWPs is currently the active BWP through control signaling. It can be that, since UEs do not always demand high data rates, a use of a wide BW can imply higher power consumption from both radio frequency (RF) and baseband signal processing perspectives even during idle times. BWP can therefore provide an approach for connected UEs with smaller BW than the configured cell bandwidth, thereby providing the UEs with more energy-efficient operational modes despite the support of wideband operation. In some examples, the base station can activate and deactivate BWPs of a UE using the same downlink control signaling as for scheduling information. In other examples, a UE can be scheduled such that the UE only transmits or receives within a certain frequency range. Compared to this approach, a difference with BWP can be that the UE is not required to transmit or receive outside of the configured frequency range of the active BWP, which can attribute power saving from the following aspects:

A possibility to operate an RF-baseband interface with a lower sampling rate and reduced baseband processing needed to transmit or receive with narrower bandwidth.

UE RF bandwidth adaptation can provide UE power saving at least where default carrier bandwidth before adaptation is relatively large.

In some examples, actual power consumption can depend on each modem and RF implementation, which can makes providing a universal power saving gain number subjective. In some examples, power savings gain measures can be significant in terms of defining the actual quality of experience (QoE) of the users. User applications can have different types of requirements for downlink/uplink (UL) throughput, packet latencies, or resource demand from a network. Therefore, there can be an increasing focus towards improving end-user experiences and adapting network capacity to meet many different types of data usage. To that end, it can be that achieving the highest possible data rates is not always a main requirement of the application and user experience, and aspects like battery life can be important, as well. This can imply that power consumption is to be considered based on a traffic profile with regards to traffic types and their data rate requirements.

The present techniques can be implemented in the following ways, for example. Adapting DL base station bandwidth can be performed to facilitate network energy savings, per a ML model that can take into account network traffic characteristics, and use an ML-based power consumption model, whereby the adaptation of the bandwidth part can be enacted only when pre-established NES savings thresholds are deemed reachable.

A ML-based traffic prediction model can be used to develop a dynamic base station power consumption behavior with an assumption of full traffic, and use of optimal BWP per traffic demand, where a difference of the two can be used a decision metric for network energy savings.

A graduated adaptation of DL bandwidth can be implemented, based on reduction in power consumption with bandwidth scaling, and using a scheme as described herein for network energy savings procedures.

FIG. 1 illustrates an example system architecture 100 that can facilitate network energy savings using bandwidth scaling in base stations in accordance with an embodiment of this disclosure.

System architecture 100 comprises base station 102 and user equipment 104. In turn, base station 102 comprises determined bandwidth sizes 106, and network energy savings using bandwidth scaling component 108.

Each of base station 102 and/or user equipment 104 can be implemented with part(s) of computing environment 1100 of FIG. 11. Base station 102 can generally comprise one or more antennas and electronic communications equipment to facilitate network communications with user equipment 104. User equipment 104 can generally comprise a computing device, with one or more antennas, used by an end user to communicate with base station 102.

As part of communicating with user equipment 104 (including examples of communicating with multiple user equipment devices), base station 102 can determine a bandwidth size of determined bandwidth sizes 106 to use for communications. Where this determined bandwidth size is lower than a current bandwidth size, there can be an energy savings associated with the base station using this lower new bandwidth size.

In some examples, network energy savings using bandwidth scaling component 108 can implement part(s) of the process flows of FIGS. 6-10 to implement network energy savings using bandwidth scaling in base stations.

FIG. 2 illustrates an example adaptive bandwidth usage 200 for bandwidth usage for a base station based on operator spectrum allocation that can facilitate network energy savings using bandwidth scaling, in accordance with an embodiment of this disclosure. In some examples, part(s) of adaptive bandwidth usage 200 can be used to implement part(s) of system architecture 100 of FIG. 1.

Adaptive bandwidth usage 200 comprises spectrum allocated to an operator 202, cell-specific total channel bandwidth 204, BWP adaptation at base station transceiver (Tx) 206 (which can be implemented according to the present techniques), adaptive cell-specific bandwidth part 208, UE-specific offset from carrier 210, UE-specific bandwidth part 212, bandwidth part 214, and network energy savings using bandwidth scaling component 216 (which can be similar to network energy savings using bandwidth scaling component 108 of FIG. 1).

BWP and its utility are depicted in FIG. 2. While a widest bandwidth can be a cell bandwidth or the one that a mobile network operator (MNO) can use in that band based on its allocated spectrum in that band, the present techniques can relate to smaller bandwidth portions that can be carved out from within this wideband total cell bandwidth. It can be inferred from Nyquist principles that, in order to sample a signal that spans the total bandwidth of 'B' MHz, a sampling rate of 2B MHz (typically higher) can be a minimum requirement. This can incur a power consumption penalty in a form of the data converters (analog-to-digital (ADC)) that can be required to sample a wideband signal. While some UEs can reduce the impact of this requirement through the use of UE-specific BWP, doing the same for a base station, i.e., using a reduced transmission bandwidth to communicate with the UEs that are currently served by the BS (or even will be potentially served at a future time) during idle or low traffic periods can involve more steps, as, in addition to a required signaling overhead to communicate the use of such reduced bandwidth, there can be additional policies that de-risk transmission delays and other key performance indicator (KPI) degradation in conjunction with prioritization of energy savings.

Some prior approaches have generally utilized the notion of BWP as applied to the that specific UE's transmission or reception bandwidth to reduce UE power consumption, they do not help in reducing base station power consumption in any way. A base station can typically cover an entire spectrum allocation of a particular operator. However, for efficient network design, the base station can have a power profile that scales as per variation in data rate/aggregate traffic demand. It can be that RAN power consumption does not linearly scale with a reduction in transmit data rate, such as when an active base station utilizes full bandwidth to transmit lower data rate traffic profiles. Moreover, a need to support full operator bandwidth might be true in a macrocellular environment, but a 5G NR scenario can involve a deployment of private wireless networks that have a lesser need to support full bandwidth at all times. A ubiquitous need for power savings in a base station can necessitate a consideration of approaches that can lend non-negligible gains in an overall energy efficiency of a network. The present techniques can be implemented to facilitate adaptive bandwidth usage by a base station to conserve power consumption.

In some examples, energy consumption due to wide bandwidth of cellular wireless consumption can be unsustainably high, and can cause a significant strain on the operational expenditures (OPEX) of network operators. Furthermore, with a drive towards higher throughput, a maximum bandwidth for 5G networks can be of the order of 400 MHz for some frequency bands, which can be 4 times greater than that considered for the generations just prior to Release-15. Supporting such wide bandwidths can cause a significant energy drain in RF and physical layer (PHY) modules spanning a radio unit (RU) and some parts of a distributed unit (DU) as well. Furthermore, a fronthaul that provides a connection between the RU and DU can also face significant pressure due to a high number of in-phase quadrature (I/Q) signals that can need to be carried with a very high throughput, despite measures such as compression. These, and other aspects, can make supporting the maximum bandwidth at the base station challenging from both an operational and an energy efficiency point of view. While measures can be taken according to a 3GPP standard to reduce a burden of supporting wide bandwidths for UEs, it can be that there are few measures that are taken to enhance the overall energy efficiency for the BS.

One problem with prior approaches can be that energy consumption when using a wide bandwidth can be considerably high due to wideband RF components that are used in the radio unit, such as a single wideband PA or a multi-carrier PA (MCPA). While power savings schemes can be used for MCPA when the full carrier is switched off completely, this approach can be inflexible, and can be that this approach can only be done when the network load is significantly low, such that a number of carriers that are budgeted for the network are no longer needed for the capacity demand. It can be that a possibility of granular adaptive scaling through switching ON and OFF component carriers (CC) also does not exist. Moreover, the use of CC can cause some wastage due to a need for some amount of guard band in real-world transmission.

Some problems can be present in 5G NR by virtue of a control overhead signaling for wide bandwidth transmission. For example, the following issues with respect to higher baseline power consumption can be attributed to system configurations present in 5G:

When UEs are in an active/connected mode with no data being transmitted, only physical downlink control channel (PDCCH) is transmitted, it can reflect the baseline power consumption for the BS. Even in such a mode, the BS power consumption can keep increasing with increasing bandwidth and with higher subcarrier spacing (SCS).

For a maximum throughput scenario, it can be that the higher the throughput gets, the higher the power consumed. However at the same time, despite inherent efficiencies inbuilt into the 5G Standard specification, a normalized power can be higher compared to previous generation.

These problems can highlight higher effective power dissipation with wider bandwidth.

Another problem with prior approaches can relate to system performance optimization with BW adaptation. Use of BWP adaptation for UEs can have impacts on system performance. While it can be that little impact is expected when there is high load (as there is little to no benefit in using BWPs as most of the allocated spectrum can be utilized by the base station in order to support an overall traffic demand), bursty traffic requests from UEs with sporadic high transmissions can cause interference issues. This can be seen when considering how base station transmit bandwidth can be held constant, and, therefore, when UEs expand and contract BWP per demand, the bit and power loading of adjacent subcarriers can also change sporadically causing inter-subcarrier interference.

The present techniques can be implemented to alleviate some of these problems, while ensuring an optimal (or improved) energy consumption performance of the base station that caters to traffic demands.

Another problem with prior approaches can relate to RF tuning. When it is expected that a UE will perform RF adaptation due to BWP switching, a physical RF retuning time can be considered, which can be referred to as switching delay. The following measures can be considered with respect to switching time.

For intra-band operation, for sub-6 GHz, the transition time can be up to 20 microseconds (s) if the center frequency is the same before and after the bandwidth adaptation.

For intra-band operation, at least for sub-6 GHz, the transition time can be 50-200 s if the center frequency is different before and after the bandwidth adaptation.

The present techniques can be implemented to facilitate DL BWP use and adaptation. The present techniques can be implemented to adapt the transmit bandwidths of base station radio units (RUs) as per traffic demand, where a number of resource blocks (RBs) needed to satisfy the traffic demand can be contained within a bandwidth of 'M' MHz, where a total cell bandwidth per the spectrum allocation of the network operator can be 'B' MHz, where B>M.

It can be that, at a given time, only one DL BWP configuration is allowed to be active for a serving cell (SCell). In some examples, to comply with operator BW allocation, it can be that configured BWPs cannot be larger than a maximum BW allocated to the operator for that network, and it can be that the connected UEs are not expected to receive signals outside the active DL BWP configuration. Furthermore, where the UEs implement a BWP at their own end that is smaller than the cell wide BWP used by the base station for that cell, then the UE BWP can need to be smaller than the base station DL BWP. In other words, it can be that base station BWP should be a superset of all UE BWPs to ensure that UE connectivity and demands are always met.

A base station scheduler can further reconfigure the allocated spectrum to a UE to compress the allocated bandwidth for downlink where it helps achieve a smaller BWP without affecting UE quality of service (QoS). It can be that scaling DL bandwidth should lead to non-negligible network energy savings in order to be activated. In some examples, bandwidth scaling can be further combined with other network energy savings mechanisms, such as advanced sleep mode (ASM) management for the base station, which allows for various hardware modules within the base station to be put to sleep on a temporal basis. This can facilitate leveraging both time and frequency dimension simultaneously to reduce overall energy consumption of the base station. Furthermore, where traffic patterns can be predicted with good accuracy by a higher level entity such as a RAN intelligent controller (RIC), then such combined bandwidth-scaling and time-domain powering down of hardware can be coordinated such as to trigger either one or both depending on the KPI constraints using machine learning (ML)-based prediction.

The present techniques can be implemented to facilitate adaptive bandwidth activation/deactivation and switching. In some examples, a reduced bandwidth operation as per aggregate cell traffic demand can enable network energy savings. Nonetheless, changing the cell bandwidth can have an impact on an overall functioning of the network, including how the UEs monitor control channels and request additional traffic from the base station. Therefore, a trigger for a bandwidth adaptation and the amount by which it is modified can be decision to make, along with a duration for which the bandwidth will remain in the new state. The following describes approaches to facilitate these aspects, including two specific triggers for re-adaptation of the bandwidth, namely:

Traffic threshold-based BW adaptation (BWAdapt_DEM_TRIGGER), and

Duration based BW adaptation (BWAdapt_DUR_TRIGGER).

BWAdapt_DEM_TRIGGER can comprise a signal that is generated by a bandwidth adaptation logic block (described herein) within a base station, based on a prediction of reduced traffic for a substantial duration such that a time required for reduction of transmit bandwidth and resetting to a wider one can be negligible in comparison to a time during which the base station will be operating with the reduced bandwidth.

BWAdapt_DUR_TRIGGER can comprise a signal as follows. For a case of UE BW adaptation, a BWP inactivity timer can be used to return to a default BWP configuration. In contrast, according to the present techniques, a duration trigger for a base station can be used in a different manner. Where full cell bandwidth has not been used for a certain duration that is configurable by the system designer, the BWAdapt_DUR_TRIGGER can be set to 1 and the base station can be set to a BWP use that is reduced by a certain factor. Examples of this are described herein. A duration can be measured by a counter that starts counting up when the base station is configured to use the full cell bandwidth and the normalized bandwidth usage (which can be defined by used bandwidth divided by full cell bandwidth) is less than a threshold amount, denoted by NORM_BW_THRESH, in a contiguous subframe. In some examples, a value of NORM_BW_THRESH can be empirically set to be 0.8. Once the base station transitions to the lower bandwidth configuration, BWAdapt_DUR_TRIGGER can be reset to 0. The counter used to set BWAdapt_DUR_TRIGGER can continue to be 0 till the system is again using the full cell bandwidth and starts counting up again where the normalized utilized bandwidth is lower than NORM_BW_THRESH.

In some examples, more often than not, the BWP adaptation at the base station can be expected to be initiated using the BWAdapt_DEM_TRIGGER. However, the second trigger can create an opportunity to implement BW adaptation where the traffic thresholds have been loosely set, and the base station is still adapting the appropriate traffic threshold, which in some examples can be set by a deep reinforcement learning (DRL) agent that learns the environment to establish an optimal (or improved) threshold. Rewards can accordingly be set for reinforcement learning (RL) agents by an operational environment, where an improvement in network energy savings (NES) through the agent's actions can receive a positive reward, while a latency incurred due to BA triggered by the RL agent's recommendation can earn a negative reward.

The present techniques can be implemented to facilitate adaptive bandwidth scaling for downlink transmission. A transmit bandwidth used by a base station for downlink transmission can vary on a dynamic basis as per a network load to facilitate network energy savings (NES) at a cellular level. A base station can use a wide bandwidth (up to a maximum allocated to an operator for a cell) when a large amount of data is scheduled for different UEs (whereby each UE can further be implementing BWP at their end to reduce the bandwidth monitored by the UE itself), while being active on a narrow bandwidth for the remaining time. A base station can support a very wide channel bandwidth, which might not be supported by some UEs. The present techniques can be implemented to support devices of different bandwidth capabilities by configuring a base station to communicate with the devices with different BWPs. BWP can provide a mechanism to flexibly assign radio resources such that the signals for a UE are confined in a portion of base station channel bandwidth that the UE can support.

The present techniques can be implemented to facilitate use of ML-predicted traffic to perform BWP adaptation. RF front-end devices can comprise elements that have finite activation (rise) times and deactivation (fall) times. It can be that device implementations need to take into account these meta states, and provide some advance notice on when the transitions in transmit bandwidth can occur as the related control information can need to be provided to connected UEs through, for example, broadcast information or downlink control information (DCI) so that the UEs can also reduce their scanning bandwidths as per UE BWP part procedures in accordance with a 5G NR standard. Furthermore, while AI/ML predicted traffic can create opportunities for use of reduced bandwidth and power consumption, which can involve shutting down related baseband processing modules, it can be, in some examples, that these procedures for bandwidth scaling are initiated only when the following two aspects are present:

A transition to a higher/lower bandwidth usage can persist for a significant duration such that the transition time is a negligible duration, e.g., less than 0.1%, of the time that the base station can spend in the reduced/increased BWP state.

Network energy savings, as measured through a predetermined lookup table (LUT) pertaining to the radio unit/RAN module is higher than a minimum savings granularity targeted—for example 5% of full power mode.

In some examples, an AI/ML-based traffic predictor can be implemented that is configured to use previously-collected traffic statistics, and use appropriate ML constructs such as a long-short term memory (LSTM)-based prediction for traffic demand, which can be used by a bandwidth adaptation (BA) logic block to pre-determine a need for a bandwidth change.

In some examples, a similar goal can be pursued by considering a reinforcement learning (RL)-based approach whereby a RL agent can learn traffic usage patterns, and then recommend a bandwidth part that is appropriate for usage by a base station to satisfy KPI constraints, as well as prioritize NES.

FIG. 3 illustrates an example bandwidth adaptation scheme 300 for scheduling for dynamic bandwidth adaptation that can facilitate network energy savings using bandwidth scaling, in accordance with an embodiment of this disclosure. In some examples, part(s) of bandwidth adaptation scheme 300 can be used to implement part(s) of system architecture 100 of FIG. 1.

Bandwidth adaptation scheme 300 comprises buffer queues 302, UE_1_buffer 302A, UE_k_buffer 302B, UE_N_buffer 302N, bandwidth adaptation logic component 304, ML traffic predictor model update 306, overall traffic demand—real time 308, medium access control (MAC) scheduler 310, PHY+RF components 312, wireless channel 314, user_1 316A, user_k 316B, and user_N 316N.

The present techniques can be implemented to facilitate energy-efficient scheduling for dynamic bandwidth adaptation. In scheduling examples, even when the available resources are fixed, there can be a complexity where total available resources change on a quasi-static basis. In some examples, changing DL transmit bandwidth on a quasi-static basis can be performed so that an overhead of signaling changes to both the connected UEs and to the radio unit functionality does not outweigh the benefits from doing so.

In FIG. 3, a bandwidth adaptation (BA) logic component is depicted, which can be used to set a correct bandwidth for transmission. A benefit of such a component can be to be able to predict an onset of a bandwidth change requirement, and to be able to communicate through a common DCI block to all users when the bandwidth is being switched down. In doing so, the BA logic module can make use of a ML traffic predictor, which can be configured to use a combination of offline and online learning. The ML traffic predictor model update component can be configured to receive inputs regarding real-time input demand from UEs that are already connected to the BS. This information can then be used to constantly refine a traffic predictor model, and provide timely updates to the BA logic component.

Predicted traffic demand information can be used by the BA logic component as follows:

Where a predicted bandwidth requirement based on current modulation and coding scheme (MCS) levels (on a per scheduled UE basis) and the buffer queue status is lower than what is currently being used by more than N_REDUCE physical resource blocks (PRBs), the BA logic component can increment the BA_LOWER_CNT by 1. (N_REDUCE can be a system defined number and, in some examples, can equal 12, 18, 24, 36 . . . and higher.)

Where the BA_LOWER_CNT reaches BA_LOW-ER_THRESH, the BA logic component can recommend a lower bandwidth use to a MAC scheduler. The BA_LOWER_THRESH can be set by a system administrator to avoid frequent BA. BA_LOWER_CNT can be reset to 0.

Where a smaller bandwidth than the total cell bandwidth is in use, and traffic demand exceeds a currently used bandwidth, then BA_HIGHER_CNT can be incremented.

Where the BA_HIGHER_CNT reaches BA_HIGHER_THRESH, the BA logic component can recommend a higher bandwidth use to the MAC scheduler. The BA_HIGHER_THRESH can be set by a system administrator to avoid frequent BA. BA_HIGHER_CNT can be reset to 0. When full system bandwidth is being utilized, BA_HIGHER_CNT can continue to be 0.

When a BA change is accepted by the MAC Scheduler based on a recommendation of the BA logic component and a buffer queue status, corresponding control signals can be sent to the UEs through a PDCCH channel 'N' subframes in advance, where N>3, to allow for the UEs to make the requisite changes as well.

When bandwidth is expanded for downlink, it can be that it does not imply an expansion in uplink bandwidth as well, since to schedule UEs in an expanded bandwidth, the base station can need to restart the uplink channel estimation modules to send the recommended MCS information to the UEs, as well. So, in some examples, for the uplink BA, there can be a modem-dependent lag in uplink bandwidth expansion.

By reducing used transmit bandwidth, it can be possible to have little-to-no degradation in latency incurred by the UE, as bandwidth reduction can be based on aggregate traffic demand. To be more aggressive in terms of energy savings, a BWP reduction greater than a minimum required bandwidth for aggregate traffic demand can also be exercised with an associated impact on latency. In some examples, this approach can be implemented when the base station is primarily handling non-guaranteed bit rate (GBR) traffic.

The following are examples of how adaptive bandwidth scaling can provide a more economical approach to network power consumption that can factor in traffic characteristics and adapt DL operating bandwidth.

An example of implementing the present techniques can involve building a bandwidth adaptive power consumption model. When a base station is allowed to alter overall DL transmission bandwidth on a more granular scale than switching off/on a full carrier, a substantial increase in energy efficiency of the RAN operations can be realized. However a building block for such a procedure can be a scalable power consumption model that depends on operating DL bandwidth, and can potentially be representative of a design optimization within a radio unit for wide bandwidth operation. FIG. 4 provides an example of how bandwidth parts can be constructed from the full cell bandwidth such that using such a reduced BWP can lead to meaningful savings in energy consumption despite additional overheads and computation involved with selecting an appropriate BWP.

In some examples, such a table can also incorporate energy savings from baseband processing, as well. It can be that such savings can be relatively smaller than those possible through scaling of RF processing.

FIG. 4 illustrates example relative bandwidth parts 400 that can facilitate bandwidth adaptation for downlink communications at a base station that can facilitate network energy savings using bandwidth scaling, in accordance with an embodiment of this disclosure. In some examples, part(s) of relative bandwidth parts 400 can be used to implement part(s) of system architecture 100 of FIG. 1.

Relative bandwidth parts 400 comprises bandwidth adaptation sizes 402, adaptive BWP_1 404, adaptive BWP_2 406, adaptive BWP_3 408, adaptive BWP_4 410, and network energy savings using bandwidth scaling component 412 (which can be similar to network energy savings using bandwidth scaling component 108 of FIG. 1).

Different examples of implementing the present techniques can involve examples of adaptive BWP for DL transmission. In order to facilitate an implementation of adaptive bandwidth scaling for DL, a number of variations of BW slicing can be considered, with a maximum number of physical resource blocks denoted by PRB_max, which can be dependent on a maximum bandwidth that an operator has been allocated for that cell. Some of these energy savings combinations for adaptive bandwidth scaling are as shown in FIG. 3:

For some operation of a base station, upon powering up, it can be that all base stations are expected to launch with full bandwidth, and therefore consume "full power." Subsequently, depending on traffic usage BW, granularities with 25%, 50% and 75% of full bandwidth can be used as presets to adapt to the traffic demand. In these examples, the number of preset levels is 4, and these examples can more generally indicate a relatively-low overhead transmit bandwidth adaptation that can be required to add to prevent frequent scaling. For examples that can tolerate greater overheads based on transmission scenarios, a greater granularity at steps of 10 or 20% can be implemented.

FIG. 5 illustrates an example lifecycle management technique 500 for bandwidth adaptation at a base station using a bandwidth part that can facilitate network energy savings using bandwidth scaling, in accordance with an embodiment of this disclosure. In some examples, part(s) of lifecycle management technique 500 can be used to implement part(s) of system architecture 100 of FIG. 1.

Lifecycle management technique 500 comprises initial BW stage 502, reduced BW stage 1-BWP 1 504, reduced BW stage 2-BWP 2 506, default BW stage-BWP_default 508, and network energy savings using bandwidth scaling component 510 (which can be similar to network energy savings using bandwidth scaling component 108 of FIG. 1).

The present techniques can be implemented to facilitate bandwidth adaptation lifecycle for base station BWP stages. Using various bandwidth part illustrations as shown in FIG. 4, it can be seen in FIG. 5 how a base station can be in different BW stages, and consequently energy consumption stages, as a result of such bandwidth scaling. When the base station powers up, it can occupy a full allocated spectrum, and as such, it can be that the initial state (502) does not provide any reduction in power consumption. In some examples, reduction in bandwidth (or increase when it is in one of the narrow BWP states) can be triggered by a trigger as described above.

FIG. 5 further shows that for initial BW stage 502, which is full bandwidth usage, the base station can enter into reduced BW stage 1-BWP 1 504 with a BWAdapt_DEM_TRIGGER, and subsequently enter into reduced BW stage 2-BWP 2 506 with an even lower power consumption and an additional BWAdapt_DEM_TRIGGER. However, when sufficient time has been spent in reduced BW stage 2-BWP 2 506, and no further traffic triggers are received, the BWAdapt_DUR_TRIGGER can reset the base station into a 75% BW stage (e.g., default BW stage-BWP_default 508), for example, to ensure that a reduced energy consumption objective does not compromise a latency KPI.

FIG. 6 illustrates an example process flow 600 that can facilitate network energy savings using bandwidth scaling in base stations, in accordance with an embodiment of this disclosure. In some examples, one or more embodiments of process flow 600 can be implemented by network energy savings using bandwidth scaling component 108 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, process flow 900 of FIG. 9, and/or process flow 1000 of FIG. 10.

Process flow 600 begins with 602, and moves to operation 604.

Operation 604 depicts allocating an adaptive cell-specific bandwidth part for facilitation of cellular network communications, wherein the adaptive cell-specific bandwidth part comprises a group of bandwidth sizes, and wherein respective sizes of the group of bandwidth sizes are associated with respective frequency ranges centered around the same central frequency for that cell site. That is, there can be multiple BWP sizes that can be switched among, such as in the example of FIG. 4.

After operation 604, process flow 600 moves to operation 606.

Operation 606 depicts transitioning from a first bandwidth size of the group of bandwidth sizes to a second bandwidth size of the group of bandwidth sizes, wherein the second bandwidth size is smaller than the first bandwidth size, based on determining that the second bandwidth size is sufficient, according to a first criterion, to serve a predicted amount of network traffic. This can comprise starting in an initial, largest size (the first bandwidth size), and determining that predicted traffic conditions are such that a transition can be made to a smaller size (the second bandwidth size).

In some examples, transitioning from the first bandwidth size of the group of bandwidth sizes to the second bandwidth size of the group of bandwidth sizes is performed for downlink bandwidth of the base station, and is performed independently of uplink bandwidth of the base station. That is, adaptive bandwidth sizing can be performed for downlink communications, without affecting uplink bandwidth.

In some examples, transitioning from the first bandwidth size of the group of bandwidth sizes to the second bandwidth size of the group of bandwidth sizes is performed based on determining that an amount of energy savings associated with transitioning to the second bandwidth size is greater than a threshold amount of savings. That is, it can be that a transition is made when a minimum amount of energy savings is identified. For example, it can be that the network energy savings, as measured through a pre-determined LUT pertaining to the radio unit/RAN module is higher than the minimum savings granularity targeted, for example, 5% of full power mode.

In some examples, transitioning from the first bandwidth size of the group of bandwidth sizes to the second bandwidth size of the group of bandwidth sizes is performed based on determining that a predicted amount of time to be spent using the second bandwidth size is greater than an amount of time associated with transitioning from the first bandwidth size to the second bandwidth size by at least a threshold amount of time. That is, a transition to another bandwidth size can be performed where it is determined that the transition to the higher/lower bandwidth usage can persist for a significant duration such that the transition time is a negligible duration, e.g., less than 0.1%, of the time that the base can spend in the reduced/increased bandwidth part state.

After operation 606, process flow 600 moves to operation 608.

Operation 608 depicts facilitating first cellular network communications according to the second bandwidth size. This can comprise communicating with user equipment using this smaller bandwidth size from operation 606.

After operation 608, process flow 600 moves to operation 610.

Operation 610 depicts, after transitioning from the first bandwidth size to the second bandwidth size, transitioning from the second bandwidth size to the first bandwidth size, based on determining that a second criterion has been satisfied. This can comprise periodically transitioning back up to the default bandwidth size and determining whether a smaller bandwidth size can continue to be used.

In some examples, the second criterion is specified with respect to a threshold amount of network traffic. This can be BWAdapt_DEM_TRIGGER. In some examples, the second criterion is specified with respect to a passage of an amount of time. This can be BWAdapt_DUR_TRIGGER After operation 610, process flow 600 moves to operation 612.

Operation 612 depicts, after transitioning from the second bandwidth size to the first bandwidth size, facilitating second cellular network communications according to the first bandwidth size. That is, the base station can continue to communicate with UEs while using the first bandwidth size.

In some examples, operation 612 comprises determining a new bandwidth size with which to facilitate third cellular network communications after transitioning from the second bandwidth size to the first bandwidth size, wherein determining the new bandwidth size comprises determining to remain at the first bandwidth size, or determining to transition to another of the group of bandwidth sizes that differs from the first bandwidth size. That is, a purpose of periodically returning to full bandwidth can be to reevaluate what bandwidth size to use.

After operation 612, process flow 600 moves to 614, where process flow 600 ends.

FIG. 7 illustrates an example process flow 700 that can facilitate network energy savings using bandwidth scaling in base stations, in accordance with an embodiment of this disclosure. In some examples, one or more embodiments of process flow 700 can be implemented by network energy savings using bandwidth scaling component 108 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, process flow 900 of FIG. 9, and/or process flow 1000 of FIG. 10.

Process flow 700 begins with 702, and moves to operation 704.

Operation 704 depicts maintaining a group of bandwidth sizes for cellular network communications, wherein respective sizes of the group of bandwidth sizes correspond to respective frequency ranges. In some examples, operation 704 can be implemented in a similar manner as operation 604 of FIG. 6.

After operation 704, process flow 700 moves to operation 706.

Operation 706 depicts transitioning from a first bandwidth size of the group of bandwidth sizes to a second bandwidth size of the group of bandwidth sizes, wherein the second bandwidth size is smaller than the first bandwidth size, based on determining that the second bandwidth size is sufficient, according to a first criterion, to serve a predicted amount of network traffic. In some examples, operation 706 can be implemented in a similar manner as operation 606 of FIG. 6.

In some examples, operation 706 comprises sending an indication to a user equipment of transitioning to the second bandwidth size, the user equipment reducing a scanning bandwidth to correspond to the second bandwidth size. In some examples, the indication comprises broadcast information. In some examples, the indication comprises downlink control information. In some examples, a time at which the indication is sent is determined based on an amount of time associated with bandwidth deactivation. That is, UEs can be provided with advance notice of when transitions in transmit bandwidth will occur, where related control information is provided to the connected UEs through either broadcast information or through DCI so that the UEs can also reduce their scanning bandwidths.

In some examples, operation 706 is performed based on predicting future network traffic with a long-short term memory model that has been trained on prior network traffic statistics. That is, previously collected traffic statistics and ML constructs such as a LSTM-based prediction for traffic demand can be applied to determine to change bandwidth.

In some examples, operation 706 is performed based on predicting future network traffic with a reinforcement learning model, and wherein a reward of the reinforcement learning model is defined based on satisfying a key performance indicator constraint of the future network traffic, and based on an amount of energy savings associated with transitioning to the second bandwidth size. That is, a RL approach can be implemented, whereby the RL agent learns the traffic usage patterns and then recommends a bandwidth part that is appropriate for usage by the base station to satisfy the KPI constraints as well as prioritize network energy savings.

After operation 706, process flow 700 moves to operation 708.

Operation 708 depicts communicating first cellular network communications according to the second bandwidth size. In some examples, operation 708 can be implemented in a similar manner as operation 608 of FIG. 6.

After operation 708, process flow 700 moves to operation 710.

Operation 710 depicts after transitioning from the first bandwidth size to the second bandwidth size, transitioning from the second bandwidth size to the first bandwidth size, based on determining that a second criterion has been satisfied. In some examples, operation 710 can be implemented in a similar manner as operation 610 of FIG. 6.

After operation 710, process flow 700 moves to operation 712.

Operation 712 depicts communicating second cellular network communications according to the first bandwidth size. In some examples, operation 712 can be implemented in a similar manner as operation 612 of FIG. 6.

After operation 712, process flow 700 moves to 714, where process flow 700 ends.

FIG. 8 illustrates an example process flow 800 that can facilitate network energy savings using bandwidth scaling in base stations, in accordance with an embodiment of this disclosure. In some examples, one or more embodiments of process flow 800 can be implemented by network energy savings using bandwidth scaling component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts transitioning from a first bandwidth size of a group of bandwidth sizes to a second bandwidth size of the group of bandwidth sizes, wherein the second bandwidth size is smaller than the first bandwidth size, based on determining that the second bandwidth size is threshold capable to serve a predicted amount of cellular network traffic. In some examples, operation 804 can be implemented in a similar manner as operations 604-606 of FIG. 6.

In some examples, operation 804 is performed based on predicting future network traffic with a trained model, and wherein the trained model is trained based on a combination of offline learning and online learning. That is, a determination to change bandwidth size can be based on a ML traffic predictor that uses a combination of offline and online learning.

In some examples, operation 804 is performed based on predicting future network traffic with a trained model, and wherein the trained model is iteratively trained based on real-time input demand received from user equipment that are in a radio resource control connected state. That is, inputs regarding real-time input demand from UEs that are connected to the BS can be used in performing traffic prediction.

In some examples, the second bandwidth size is less than an amount of bandwidth associated with aggregate traffic demand, and wherein transitioning from the first bandwidth size of the group of bandwidth sizes to the second bandwidth size of the group of bandwidth sizes is performed based on determining that less than a threshold amount of the aggregate traffic demand is guaranteed bit rate traffic. That is, in some examples, to increase energy savings, a BWP reduction greater than minimum required bandwidth for aggregate traffic demand can also be exercised with associated impact on latency. This can be implemented, for example, when the base station is primarily handling non-GBR traffic.

In some examples, transitioning from the first bandwidth size of the group of bandwidth sizes to the second bandwidth size of the group of bandwidth sizes is performed based on determining that an occurrence has occurred a threshold number of times, and wherein the occurrence comprises determining that a predicted bandwidth level based on a current modulation and coding scheme and buffer queue status is lower than the first bandwidth size by at least a threshold number of physical resource blocks. This can be similar to process flow 900 of FIG. 9.

After operation 804, process flow 800 moves to operation 806.

Operation 806 depicts facilitating first cellular network communications according to the second bandwidth size. In some examples, operation 806 can be implemented in a similar manner as operation 608 of FIG. 6.

After operation 806, process flow 800 moves to operation 808.

Operation 808 depicts, after transitioning from the first bandwidth size to the second bandwidth size, transitioning from the second bandwidth size to the first bandwidth size, based on determining that a criterion has been met. In some examples, operation 808 can be implemented in a similar manner as operation 610 of FIG. 6.

In some examples, determining that the criterion has been met comprises determining that traffic demand exceeds the second bandwidth size a threshold number of times. This can be similar to process flow 1000 of FIG. 10.

After operation 808, process flow 800 moves to operation 810.

Operation 810 depicts facilitating second cellular network communications according to the first bandwidth size. In some examples, operation 810 can be implemented in a similar manner as operation 612 of FIG. 6.

After operation 810, process flow 800 moves to 812, where process flow 800 ends.

FIG. 9 illustrates an example process flow 900 for decreasing bandwidth that can facilitate network energy savings using bandwidth scaling in base stations, in accordance with an embodiment of this disclosure. In some examples, one or more embodiments of process flow 900 can be implemented by network energy savings using bandwidth scaling component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 800 of FIG. 8, process flow 900 of FIG. 9, and/or process flow 1000 of FIG. 10.

Process flow 900 begins with 902, and moves to operation 904.

Operation 904 depicts determining whether the predicted bandwidth is lower than what is currently being used by more than N_REDUCE PRBs. This can be a predicted bandwidth requirement based on current MCS levels on a per scheduled UE basis and a buffer queue status. N_RE-DUCE can be a system defined number.

Where it is determined in operation 904 that the predicted bandwidth is lower than what is currently being used by more than N_REDUCE PRBs, process flow 900 moves to operation 906. Instead, where it is determined in operation 904 that the predicted bandwidth is not lower than what is currently being used by more than N_REDUCE PRBs, process flow 900 moves to 912, where process flow 900 ends.

Operation 906 is reached from operation 904 where it is determined that the predicted bandwidth is lower than what is currently being used by more than N_REDUCE PRBs.

Operation 906 depicts incrementing BA_LOWER_CNT. This can comprise adding 1 to a value stored for BA_LOW-ER_CNT.

After operation 906, process flow 900 moves to operation 908.

Operation 908 depicts determining whether BA_LOW-ER_CNT is equal to BA_LOWER_THRESH. BA_LOW-ER_THRESH can be a system designed parameter.

Where it is determined in operation 908 that BA_LOW-ER_CNT is equal to BA_LOWER_THRESH, process flow 900 moves to operation 910. Instead, where it is determined in operation 908 that BA_LOWER_CNT is equal to BA_LOWER_THRESH, process flow 900 moves to 912, where process flow 900 ends.

Operation 910 is reached from operation 908 where it is determined that BA_LOWER_CNT is equal to BA_LOW-ER_THRESH. Operation 910 depicts recommending a lower bandwidth to a MAC scheduler. BA_LOWER_CNT can be set to zero for future instances of performing process flow 900.

After operation 910, process flow 900 moves to 912, where process flow 900 ends.

Process flow 900 can be implemented periodically to determine whether to decrease a bandwidth part, while a base station facilitates network communications.

Figure 10:
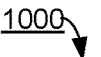
FIG. 10 illustrates an example process flow for decreasing bandwidth that can facilitate network energy savings using bandwidth scaling in base stations, in accordance with an embodiment of this disclosure.

FIG. 10 illustrates an example process flow 1000 for increasing bandwidth that can facilitate network energy savings using bandwidth scaling in base stations, in accordance with an embodiment of this disclosure. In some examples, one or more embodiments of process flow 1000 can be implemented by network energy savings using bandwidth scaling component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 800 of FIG. 8, process flow 1000 of FIG. 10, and/or process flow 1000 of FIG. 10.

Process flow 1000 begins with 1002, and moves to operation 1004.

Operation 1004 depicts determining whether less than the total cell bandwidth is being used. That is, a bandwidth part of less than 100% of total available bandwidth can be in use.

Where it is determined in operation 1004 less than the total cell bandwidth is being used, process flow 1000 moves to operation 1006. Instead, where it is determined in operation 1004 the total cell bandwidth is being used, process flow 1000 moves to 1014, where process flow 1000 ends.

Operation 1006 is reached from operation 1004 where it is determined that less than the total cell bandwidth is being used. Operation 1006 depicts determining whether traffic demand exceeds the current bandwidth.

Where it is determined in operation 1006 that traffic demand exceeds the current bandwidth, process flow 1000 moves to operation 1008. Instead, where it is determined in operation 1006 that traffic does not exceed the current bandwidth, process flow 1000 moves to 1014, where process flow 1000 ends.

Operation 1008 is reached from operation 1006 where it is determined that traffic exceeds the current bandwidth.

Operation 1008 depicts incrementing BA_HIGHER_CNT. This can comprise adding 1 to a value stored for BA_HIGHER_CNT.

After operation 1008, process flow 1000 moves to operation 1010.

Operation 1010 depicts determining whether BA_HIGHER_CNT equals BA_HIGHER_THRESH. BA_HIGHER_THRESH can be a system-defined parameter.

Where in operation 1010 it is determined that BA_HIGHER_CNT equals BA_HIGHER_THRESH, process flow 1000 moves to operation 1012. Instead, where in operation 1012 it is determined that BA_HIGHER_CNT does not equal BA_HIGHER_THRESH, process flow 1000 moves to operation 1014, where process flow 1000 ends.

Operation 1012 is reached from operation 1010 where it is determined that BA_HIGHER_CNT is equal to BA_HIGHER_THRESH. Operation 1012 depicts recommending a higher bandwidth to a MAC scheduler. BA_HIGHER_CNT can be reset to zero for future instances of process flow 1000. It can be that, when a change is accepted by the MAC scheduler based on the recommendation and the buffer queues status, corresponding control signals can be sent to the UEs through the PDCCH channel 'N' subframes in advance where N>3 to allow for the UEs to make the changes as well.

After operation 1012, process flow 1000 moves to 1014, where process flow 1000 ends.

Process flow 1000 can be implemented periodically to determine whether to increase a bandwidth part, while a base station facilitates network communications.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of base station 102 and/or user equipment 104 of FIG. 1.

In some examples, computing environment 1100 can implement one or more embodiments of the process flows of FIGS. 6-10 to facilitate network energy savings using bandwidth scaling in base stations.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

FIG. 11 illustrates an example block diagram 1100 of a computer operable to execute an embodiment of this disclosure. A UE of UE(s) 1104A, 1104B, and 1104N can generally comprise a device used by an end user to access a communications network. A UE can be configured to communicate with core network 1108.

Messages sent from a UE can be received and processed by core network 1108, which can comprise components of a third generation (3G), 4G, long term evolution (LTE), 5G, or other, wireless communication network. Core network 1108 can be configured to establish connectivity with UE 1104, such as through facilitating services such as connectivity and mobility management, authentication and authorization, subscriber data management, and policy management. Messages sent between a UE and communications network 1106 can propagate through one of base station 1118A (which comprises centralized unit (CU) 1110, DU 1112, RU 1114, and antenna 1116), base station 1118B, and base station 1118N.

CU 1110 can be configured to process non-real-time radio resource control (RRC) and packet data convergence protocol (PDCP) communications. DU 1112 can be configured to process communications transmitted according to radio link control (RLC), MAC, and PHY layers. RU 1114 can be configured to convert radio signals sent to antenna 1116 from digital packets to radio signals, and convert radio signals received from antenna 1116 from radio signals to digital packets. Antenna 1116 (which can comprise a transceiver) can be configured to send and receive radio waves that are used to convey information.

CONCLUSION

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, other optical disk storage, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/ output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:

allocating, by a system comprising at least one processor, an adaptive cell-specific bandwidth part for facilitation of cellular network communications, wherein the adaptive cell-specific bandwidth part comprises a group of bandwidth sizes, and wherein respective sizes of the group of bandwidth sizes are associated with respective frequency ranges;

predicting that a first amount of network traffic will occur during a first period of time;

predicting that a second bandwidth size will be sufficient for the first period of time according to a defined sufficiency criterion, to produce a first prediction;

transitioning, by the system, from a first bandwidth size of the group of bandwidth sizes to the second bandwidth size of the group of bandwidth sizes, wherein the second bandwidth size is smaller than the first bandwidth size, based on determining that the second bandwidth size is sufficient, according to a first criterion, to serve a predicted amount of network traffic, wherein the first criterion is a function of the first prediction that the second bandwidth size will be sufficient for the first period of time according to a defined sufficiency criterion, wherein transitioning from the first bandwidth size of the group of bandwidth sizes to the second bandwidth size of the group of bandwidth sizes comprises, maintaining a counter, wherein the counter indicates a number of observed occurrences of observing that a predicted bandwidth level based on a current modulation and coding scheme and buffer queue status is lower than the first bandwidth size by at least a threshold number of physical resource blocks, based on determining that a value of the counter that an occurrence of the observed occurrences occurs, incrementing the counter to produce an updated value, and based on determining the update value satisfies a threshold value, transitioning from the first bandwidth size of the group of bandwidth sizes to the second bandwidth size of the group of bandwidth sizes;

facilitating, by the system, first cellular network communications according to the second bandwidth size;

after transitioning from the first bandwidth size to the second bandwidth size, transitioning, by the system, from the second bandwidth size to the first bandwidth size, based on the expiration of a timer before making a second prediction that the second bandwidth size will be sufficient for a second period of time according to the defined sufficiency criterion, wherein the first bandwidth size satisfies a default bandwidth size criterion; and after transitioning from the second bandwidth size to the first bandwidth size, facilitating, by the system, second cellular network communications according to the first bandwidth size.

2. The method of claim 1, further comprising:

determining, by the system, a new bandwidth size with which to facilitate third cellular network communications after transitioning from the second bandwidth size to the first bandwidth size, wherein determining the new bandwidth size comprises determining to remain at the first bandwidth size, or determining to transition to another of the group of bandwidth sizes that differs from the first bandwidth size.

3. The method of claim 1, wherein the second criterion is specified with respect to a threshold amount of network traffic.

4. The method of claim 1, wherein transitioning from the first bandwidth size of the group of bandwidth sizes to the second bandwidth size of the group of bandwidth sizes is performed for downlink bandwidth, and is performed independently of uplink bandwidth.

5. The method of claim 1, wherein transitioning from the first bandwidth size of the group of bandwidth sizes to the second bandwidth size of the group of bandwidth sizes is performed based on determining that a predicted amount of time to be spent using the second bandwidth size is greater than an amount of time associated with transitioning from the first bandwidth size to the second bandwidth size by at least a threshold amount of time.

6. The method of claim 1, wherein transitioning from the first bandwidth size of the group of bandwidth sizes to the second bandwidth size of the group of bandwidth sizes is performed based on determining that an amount of energy savings associated with transitioning to the second bandwidth size is greater than a threshold amount of savings.

7. A system, comprising:

at least one processor; and at least one memory that stores executable instructions that, when executed by the at least one processor, facilitate performance of operations, comprising:

maintaining, by the system, a group of bandwidth sizes for cellular network communications, wherein respective sizes of the group of bandwidth sizes correspond to respective frequency ranges;

predicting, by the system, that a first amount of network traffic will occur during a first period of time;

predicting, by the system, that a second bandwidth size will be sufficient for the first period of time according to a defined sufficiency criterion, to produce a first prediction;

transitioning, by the system, from a first bandwidth size of the group of bandwidth sizes to the second bandwidth size of the group of bandwidth sizes, wherein the second bandwidth size is smaller than the first bandwidth size, based on determining that the second bandwidth size is sufficient, according to a first criterion, to serve a predicted amount of network traffic, wherein the first criterion is a function of the first prediction that the second bandwidth size is going to be threshold sufficient for the first period of time, wherein transitioning from the first bandwidth size of the group of bandwidth sizes to the second bandwidth size of the group of bandwidth sizes comprises maintaining a counter, wherein the counter indicates a number of observed occurrences of observing that a predicted bandwidth level based on a current modulation and coding scheme and buffer queue status is lower than the first bandwidth size by at least a threshold number of physical resource blocks, based on determining that a value of the counter that an occurrence of the observed occurrences occurs, incrementing the counter to produce an updated value, and based on determining the update value satisfies a threshold value, transitioning from the first bandwidth size of the group of bandwidth sizes to the second bandwidth size of the group of bandwidth sizes;

communicating, by the system, first cellular network communications according to the second bandwidth size;

after transitioning from the first bandwidth size to the second bandwidth size, transitioning, by the system, from the second bandwidth size to the first bandwidth size, based on the expiration of a timer before making a second prediction that the second bandwidth size will be threshold sufficient for a second period of time, wherein the first bandwidth size satisfies a default bandwidth size criterion; and communicating, by the system, second cellular network communications according to the first bandwidth size.

8. The system of claim 7, wherein transitioning from the first bandwidth size of the group of bandwidth sizes to the second bandwidth size of the group of bandwidth sizes comprises:

sending, by the system, an indication to a user equipment of transitioning to the second bandwidth size, the user equipment reducing a scanning bandwidth to correspond to the second bandwidth size.

9. The system of claim 8, wherein the indication comprises broadcast information.

10. The system of claim 8, wherein the indication comprises downlink control information.

11. The system of claim 8, wherein a time at which the indication is sent is determined based on an amount of time associated with bandwidth deactivation.

12. The system of claim 7, wherein transitioning from the first bandwidth size of the group of bandwidth sizes to the second bandwidth size of the group of bandwidth sizes is performed based on predicting future network traffic with a long-short term memory model that has been trained on prior network traffic statistics.

13. The system of claim 7, wherein transitioning from the first bandwidth size of the group of bandwidth sizes to the second bandwidth size of the group of bandwidth sizes is performed based on predicting future network traffic with a reinforcement learning model, and wherein a reward of the reinforcement learning model is defined based on satisfying a key performance indicator constraint of the future network traffic, and based on an amount of energy savings associated with transitioning to the second bandwidth size.

14. A non-transitory computer-readable medium comprising instructions that, in response to execution, cause a system comprising at least one processor to perform operations, comprising:

predicting that an amount of cellular traffic will occur during a first period of time;

predicting that a second bandwidth size will be sufficient for the first period of time according to a defined sufficiency criterion, to produce a first prediction;

transitioning from a first bandwidth size of a group of bandwidth sizes to the second bandwidth size of the group of bandwidth sizes, wherein the second bandwidth size is smaller than the first bandwidth size, based on determining that the second bandwidth size is threshold capable to serve the predicted amount of cellular network traffic for the first period of time, wherein transitioning from the first bandwidth size of the group of bandwidth sizes to the second bandwidth size of the group of bandwidth sizes comprises maintaining a counter, wherein the counter indicates a number of observed occurrences of observing that a predicted bandwidth level based on a current modulation and coding scheme and buffer queue status is lower than the first bandwidth size by at least a threshold number of physical resource blocks, based on determining that a value of the counter that an occurrence of the observed occurrences occurs, incrementing the counter to produce an updated value, and based on determining the update value satisfies a threshold value, transitioning from the first bandwidth size of the group of bandwidth sizes to the second bandwidth size of the group of bandwidth sizes;

conducting first cellular network communications according to the second bandwidth size;

after transitioning from the first bandwidth size to the second bandwidth size, transitioning from the second bandwidth size to the first bandwidth size, based on the expiration of a timer before making a prediction that the second bandwidth size will be sufficient for a second period of time, and wherein the first bandwidth size satisfies a default bandwidth size criterion; and conducting second cellular network communications according to the first bandwidth size.

15. The non-transitory computer-readable medium of claim 14, wherein transitioning from the first bandwidth size of the group of bandwidth sizes to the second bandwidth size of the group of bandwidth sizes is performed based on predicting future network traffic with a trained model, and wherein the trained model is iteratively trained based on real-time input demand received from user equipment that are in a radio resource control connected state.

16. The non-transitory computer-readable medium of claim 14, wherein the second bandwidth size is less than an amount of bandwidth associated with aggregate traffic demand, and wherein transitioning from the first bandwidth size of the group of bandwidth sizes to the second bandwidth size of the group of bandwidth sizes is performed based on determining that less than a threshold amount of the aggregate traffic demand is guaranteed bit rate traffic.

17. The non-transitory computer-readable medium of claim 14, wherein determining that the criterion has been met comprises:

determining that traffic demand exceeds the second bandwidth size a threshold number of times.

18. The non-transitory computer-readable medium of claim 14, wherein the operations further comprise:

determining a new bandwidth size with which to facilitate third cellular network communications after transitioning from the second bandwidth size to the first bandwidth size, wherein determining the new bandwidth size comprises determining to remain at the first bandwidth size, or determining to transition to another of the group of bandwidth sizes that differs from the first bandwidth size.

19. The non-transitory computer-readable medium of claim 14, wherein the transitioning from the first bandwidth size to the second bandwidth size comprises:

sending the user equipment an indication of the transitioning from the first bandwidth size to the second bandwidth size a defined number of physical downlink control channel subframes in advance of the transitioning from the first bandwidth size to the second bandwidth size.

20. The non-transitory computer-readable medium of claim 14, wherein transitioning from the first bandwidth size of the group of bandwidth sizes to the second bandwidth size of the group of bandwidth sizes is performed for downlink bandwidth, and is performed independently of uplink bandwidth.

\* \* \* \* \*